United States Patent
Richards et al.

(10) Patent No.: US 11,022,858 B2
(45) Date of Patent: Jun. 1, 2021

(54) MULTIPLE CAMERA APPARATUS AND METHOD FOR SYNCHRONIZED AUTOFOCUS

(71) Applicant: Motorola Mobility LLC, Chicago, IL (US)

(72) Inventors: By-Her W. Richards, Lincolnshire, IL (US); Sean C. Kelly, Barrington, IL (US); Kevin W. Johnson, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 323 days.

(21) Appl. No.: 14/549,735

(22) Filed: Nov. 21, 2014

(65) Prior Publication Data
US 2016/0147131 A1   May 26, 2016

(51) Int. Cl.
*G03B 13/36* (2021.01)
*H04N 5/225* (2006.01)
(Continued)

(52) U.S. Cl.
CPC ........... *G03B 13/36* (2013.01); *H04N 5/2258* (2013.01); *H04N 5/23212* (2013.01);
(Continued)

(58) Field of Classification Search
CPC ........ H04N 5/23212; H04N 5/232123; H04N 13/239; H04N 13/296; H04N 13/133;
(Continued)

(56) References Cited

U.S. PATENT DOCUMENTS

| | | | |
|---|---|---|---|
| 5,974,272 A | 10/1999 | Kiesow et al. | |
| 8,135,270 B2* | 3/2012 | Tanaka | H04N 5/23212 |
| | | | 396/104 |

(Continued)

OTHER PUBLICATIONS

Gary Bradski and Adrian Kaehler, "Learning Open CV: Computer Vision with the OpenCV Library", O'Reilly Media; 1st Edition (Oct. 1, 2008), Chapter 12: Projection and 3D Vision (Sub-Section: Stereo Imaging), pp. 415-417.

(Continued)

*Primary Examiner* — Samira Monshi
(74) *Attorney, Agent, or Firm* — Loppnow & Chapa; Matthew C. Loppnow

(57) ABSTRACT

A disclosed apparatus includes a plurality of camera units. Control logic, operatively coupled to each camera unit, is operative to perform a parallax operation using at least two image frames from at least two camera units to determine a common focus distance, subsequent to completing independent auto-focus operations and respective lens position adjustments for the at least two camera units. The control logic provides a control signal to at least one of the camera units to adjust its actuator to adjust lens position in response to the determined common focus distance. A test procedure is used to map focus distance to lens position for each camera unit and to generate a lookup table. The control logic uses the lookup table unique to each camera unit to adjust the lens settings according to the determined common focus distance. The parallax operation is iterated until the common focus distance converges.

16 Claims, 9 Drawing Sheets

(51) Int. Cl.
*H04N 5/232* (2006.01)
*H04N 17/00* (2006.01)
*H04N 5/247* (2006.01)
*G03B 35/08* (2021.01)
*H04N 13/00* (2018.01)

(52) U.S. Cl.
CPC ....... *H04N 5/232123* (2018.08); *H04N 5/247* (2013.01); *H04N 17/002* (2013.01); *G03B 35/08* (2013.01); *H04N 2013/0081* (2013.01)

(58) Field of Classification Search
CPC ......... H04N 13/246; H04N 2013/0081; H04N 9/045; H04N 13/189; H04N 13/243; H04N 5/232127; H04N 5/3696; H04N 7/18; H04N 13/15; H04N 13/161; H04N 13/218; H04N 13/305; H04N 13/31; H04N 13/398; H04N 5/2628; H04N 9/04557; H04N 9/09; H04N 13/128; H04N 13/194; H04N 13/211; H04N 13/214; H04N 13/257; H04N 13/271; H04N 13/349; H04N 13/371; H04N 2101/00; H04N 5/22541; H04N 5/2256; H04N 5/2258; H04N 5/2259; H04N 5/232121

See application file for complete search history.

(56) References Cited

U.S. PATENT DOCUMENTS

| | | | |
|---|---|---|---|
| 2013/0209082 A1* | 8/2013 | Cameron | H04N 13/0285 396/323 |
| 2016/0044257 A1* | 2/2016 | Venkataraman | H04N 5/2258 348/239 |
| 2016/0073179 A1* | 3/2016 | Havekes | H04N 5/247 725/32 |

OTHER PUBLICATIONS

Williams, Steve, "Combined Search and Examination Report," GB Intellectual Property Office, dated Mar. 7, 2016.

* cited by examiner

MULTIPLE CAMERA APPARATUS AND METHOD FOR SYNCHRONIZED AUTOFOCUS

FIELD OF THE DISCLOSURE

The present disclosure relates generally to imaging devices such as digital cameras and more particularly to methods and apparatuses for imaging device calibration and synchronization in autofocus.

BACKGROUND

Many imaging devices such as digital cameras include an auto-focus capability that mechanically moves a lens using an actuator in order to capture an image in focus. An autofocus routine makes a determination of image sharpness for the specific lens position and may iterate lens position until the algorithm converges on a final lens position.

The situation is more complex when two or more camera units, with corresponding two or more lenses, are used in image capture where each camera unit employs its own autofocus capability. The challenges related to multi-camera auto-focus synchronization issues do not appear to have been resolved in existing imaging systems.

For example, in a system with two cameras, the autofocus routines need to converge for each camera prior to image capture, and the two cameras need to start the capture at the same time. Otherwise, two scenarios may occur. In one scenario, the image captured by a camera without autofocus convergence (i.e. out of focus) will be blurry, and the other image captured by a camera with autofocus convergence (i.e. in focus) will be sharp. When the two images are combined, it is very difficult to find the corresponding pixels between a blurry image and a sharp image. In a second scenario, if moving objects at a scene are not captured at the same time by the two cameras, ghosting may result in the combined image, and also the stereo matching algorithm or image registration algorithm may fail.

DETAILED DESCRIPTION

Figure 1:
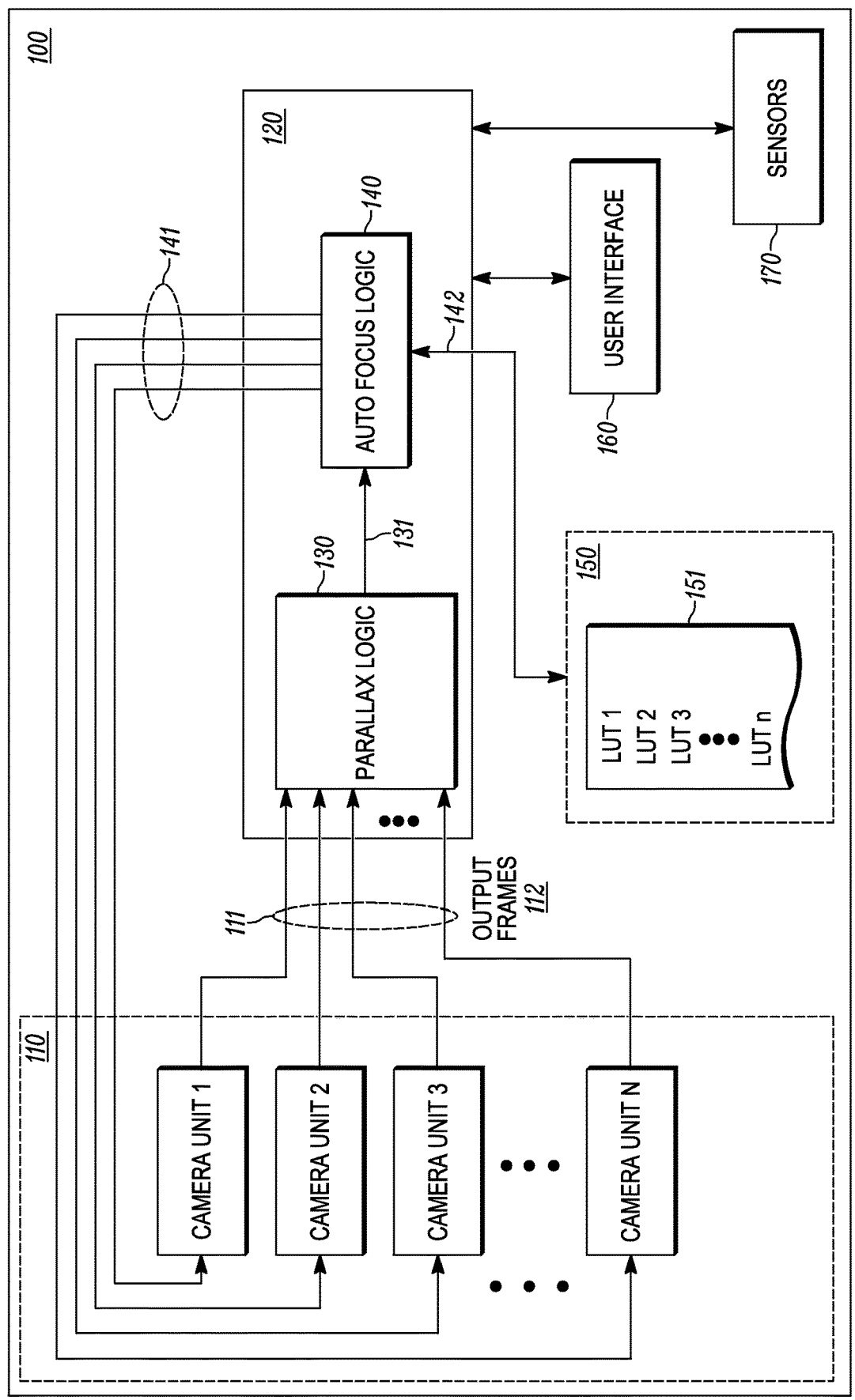
FIG. 1 is a block diagram of an example apparatus with multiple camera units and auto focus logic in accordance with an embodiment.

Briefly, the disclosed embodiments reduce image blurriness in a multi-camera unit apparatus by synchronizing the lens auto-focusing of two or more camera units. More particularly, the present disclosure provides apparatuses and methods for autofocus in a multi-camera unit apparatus.

One disclosed embodiment provides an apparatus that includes a plurality of camera units. Each camera unit includes a lens, a sensor, and an actuator to adjust the lens position. Control logic is operatively coupled to each camera unit. The control logic is operative to perform a parallax operation using at least two image frames from at least two camera units to determine a common focus distance. The parallax operation is performed subsequent to completing independent auto-focus operations and respective lens position adjustments for the at least two camera units. The control logic provides a control signal to at least one of the camera units to adjust the at least one camera unit actuator, to set the at least one camera unit lens to a lens position corresponding to the common focus distance.

Non-volatile, non-transitory memory is operatively coupled to the control logic and stores camera calibration data for each camera unit. The camera calibration data is related to lens position versus focus distance settings for each camera unit. The memory may be distributed such that each camera unit includes a memory component that stores its unique camera calibration data. The control logic is operative to access the memory to obtain the camera calibration data for each camera unit. In some embodiments, the control logic may also be operative to obtain an initial lens position setting for each camera unit from the corresponding actuator of each camera unit.

The control logic may iteratively perform the parallax operation by subsequently obtaining two image frames after setting one or more of the camera unit lenses to a lens position corresponding to the common focus distance. In other words, the control logic may continue to iterate the common focus distance determination and provide subsequent control signals to one or more of the camera units to set the respective lens positions to a final lens position after completion of the iterations.

In some embodiments, the control logic is operative to provide the control signals as lens position settings unique to each camera unit based on camera calibration data for each camera unit. The control logic accesses and uses the camera calibration data related to lens position versus focus distance settings for each camera unit to determine these lens position settings. The camera calibration data may be in the format of a lookup table. The non-volatile, non-transitory memory may be distributed as a separate memory components located in each camera unit. Each camera unit memory component is accessible by the control logic and contains the camera calibration data specific to each camera unit.

The present disclosure also provides a method that includes performing a parallax operation using at least two image frames from at least two camera units to determine a common focus distance, subsequent to completing independent auto-focus operations and respective lens position adjustments for the at least two camera units. The method proceeds with adjusting an actuator of at least one camera unit, in response to the common focus distance determination, to set the at least one camera unit lens to a lens position corresponding to the common focus distance. In some embodiments, the method may include obtaining camera calibration data for each camera unit. The camera calibration data is stored in non-volatile, non-transitory memory and is related to lens position versus focus distance settings for each camera unit. The method may therefore include accessing the memory to obtain the camera calibration data for each camera unit, and adjusting the actuator of the at least one camera unit using the related camera calibration data.

In some embodiments, the method may include obtaining an initial lens position setting for each camera unit from corresponding actuator of each camera unit. In some embodiments, the method may also include iterating the parallax operation by obtaining another at least two image frames subsequent to setting the at least one camera unit lens to a lens position corresponding to the common focus distance and determine an iterated common focus distance. The method then proceeds by adjusting an actuator of at least one or another of the at least two camera units to set the respective lens position to a final lens position corresponding to the iterated common focus distance.

In some embodiments, the method also consists of adjusting the actuator using a lens position setting unique to each camera unit based on camera calibration data for each camera unit, stored in a non-volatile, non-transitory memory and related to lens position versus focus distance settings for each camera unit. The accessed memory may be distributed as a separate memory located in each camera unit.

The present disclosure also provides a method for calibration of a camera unit. The method includes calculating a macro distance and maximum focus distance for a camera unit under test, according to the lens specification of the camera unit under test, setting the camera unit under test to manual focus mode, capturing at least one image frame of a contrast chart for each lens position in a range of interest for a plurality of test stops between the macro distance and the maximum focus distance, and determining an optimal lens position for each test stop using the captured image frames to generate a plurality of data points of focus distance versus optimal lens position. In some embodiments, the method may also include generating a look up table for the camera unit under test using the plurality of data points, where the lookup table maps focus distance to lens position settings. In other embodiments, the lookup table may be generated on-the-fly by the control logic of a multi-camera apparatus by accessing and using the stored camera calibration data.

It is to be understood that the term "maximum focus distance" as used throughout the present disclosure may be replaced by the term "hyperfocal distance" in some embodiments. A hyperfocal distance may be calculated by the lens specifications, per design or requirement of camera calibration data. Although the maximum focus distance may be longer than the hyperfocal distance, some camera unit manufacturers only allow the lens position to be moved in a shorter range, in order to focus from the macro distance to the hyperfocal distance. In this case, the maximum focus distance is equivalent to the hyperfocal distance.

Turning now to the drawings wherein like numerals represent like components, FIG. 1 is a block diagram of an example apparatus 100 with multiple camera units 110 and control logic 120 in accordance with an embodiment. The control logic 120 is operatively coupled to a command and control interface of each camera unit of the camera units 110, to non-volatile, non-transitory memory 150, and to a user interface 160. Each camera unit of multiple camera units 110 is operative to provide output frames 112 to the control logic 120 over the operative coupling 111. The control logic 120 includes parallax logic 130 and autofocus logic 140. The parallax logic 130 is operative to receive at least two output frames 112 from at least two of the camera units and to perform a parallax operation to determine a common focus distance 131 which is used to make lens position adjustments to one or more of the camera units 110. The common focus distance 131 is provided to the autofocus logic 140 which in turn sends one or more control signals 141 to one or more of the camera units to adjust an actuator and thereby change the lens position of the corresponding camera unit. The memory 150 includes camera calibration data 151 which is accessed by the autofocus logic 140 and used to determine the lens position settings for any specific camera unit of the camera units 110 corresponding to the determined common focus distance 131. The camera calibration data 151 may be in the form of lookup tables that map focus distances to lens position settings specific to the camera unit. For example camera unit 1 will have a lookup table 1 stored in memory, camera 2 will have a lookup table 2 stored in memory, etc. In other words, each camera unit of the camera units 110 will have a unique corresponding lookup table stored in memory 150. In some embodiments, each camera unit will have its own onboard memory component and will store its own unique corresponding camera calibration data which may be in the form of a lookup table. The camera calibration data relates lens position settings specific to the camera unit to focus distances. This camera calibration data is determined using a camera calibration method of operation in accordance with the embodiments which is described herein below.

The autofocus logic 140 is operative to provide one or more control signals 141 to adjust the lens positions of any or all camera units of the multiple camera units 110. In other words, the autofocus logic 140 may determine a lens position setting related to the determined common focus distance 131. The autofocus logic 140 may read one or more lookup tables for a camera unit from memory 150, over a memory interface 142, and may thereby obtain a corresponding lens position setting for any specific one of the camera units 110. The autofocus logic 140 is operative to send one or more control signals 141, which may include lens position settings, to each individual camera unit.

The control logic 120 may iterate the common focus distance 131, and the corresponding lens position settings, by sequentially obtaining subsequent output frames 112 from the adjusted camera units 110 and performing a sequence of parallax operations using the parallax logic 130. Therefore, after each lens position adjustment by the autofocus logic 140, the parallax logic 130 may continue to perform sequential parallax operations and the autofocus logic 140 may make corresponding lens position adjustments until the control logic 120 converges at a final common focus distance. The camera calibration data, which may be in the form of lookup tables as discussed above, are generated during factory calibration procedures for each individual camera unit.

In some embodiments, the apparatus 100 will also include one or more sensors 170. The one or more sensors 170 are operatively coupled to the control logic 120 to provide sensor data such as, but not limited to, position information, acceleration information, or some other information etc. For example, the one or more sensors 170 may include, but are not limited to, gyroscopic position sensors, accelerometers, audio sensors, motion detectors, or etc.

It is to be understood that the control logic 120 or the parallax logic 130 and/or auto focus logic 140 may be implemented as software or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. Therefore the example apparatus illustrated in the drawing figures described herein provides an example embodiment and is not to be construed as a limitation on the various other possible implementations that may be used in accordance with the various embodiments.

More particularly, parallax logic 130 and/or auto focus logic 140 may be a single component (such as control logic 120) or may be implemented as any combination of DSPs, ASICs, FPGAs, CPUs running executable instructions, hardwired circuitry, state machines, etc., without limitation. Therefore, as one example, the auto focus logic 140 may be implemented using an ASIC or an FPGA. In another example, the auto focus logic 140 may be a combination of hardware and software or firmware executed by a processor, etc. These example embodiments and other embodiments are contemplated by the present disclosure.

Figure 2:
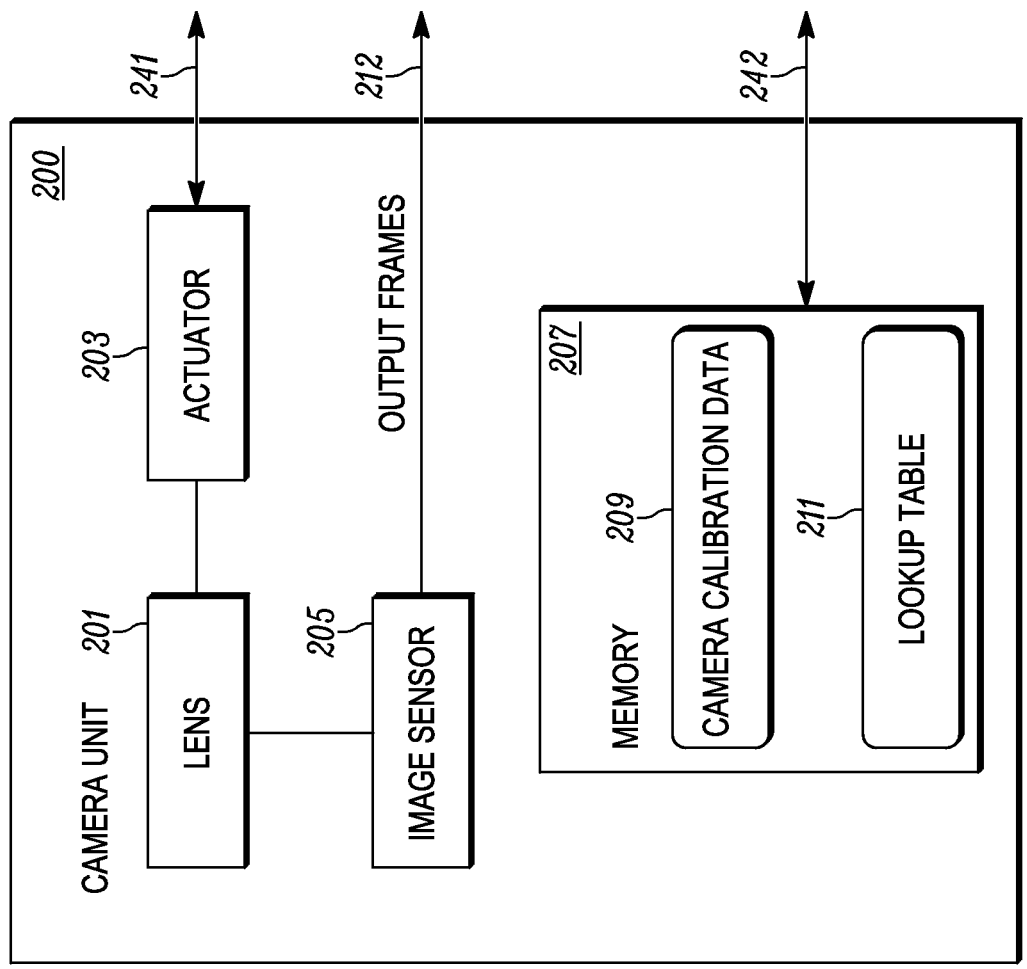
FIG. 2 is a block diagram of an example camera unit in accordance with an embodiment.

An example camera unit of the multiple camera units 110 is illustrated in FIG. 2. The example camera unit 200 includes a lens 201 that allows light to pass and reach an image sensor 205. The image sensor 205 is operative to provide image sensor data, such as image output frames 212. The lens 201 is operatively coupled to an actuator 203 that is operative to change the position of the lens for focusing. The lens actuator 203 in the various embodiments may be a voice coil motor (VCM) or may be a MEMS (micro-electro-mechanical-system) linear actuator. The actuator 203 is operative to receive control signals 241 for adjusting the lens 201 position. For example, control logic may focus the lens 201 by sending control signals 241 to the actuator 203 to adjust the lens 201 position in response to sharpness determinations rendered by an autofocus routine executed by the control logic. The camera unit 200 also includes memory 207 that stores, among other things, a lookup table 211, as well as camera calibration data 209. The memory 207 is accessible by a memory interface 242.

The lookup table 211, in accordance with the embodiments, relates focus distances to lens position settings specific to the camera unit 200. The lookup table 211 is one possible format of camera calibration data that is determined during a factory calibration procedure in accordance with the embodiments. The lookup table 211 may be accessed by external processing components through the memory interface 242. An example test setup 300 for generating a lookup table 211 for a camera unit under test in accordance with an embodiment is shown in FIG. 3.

Figure 3:
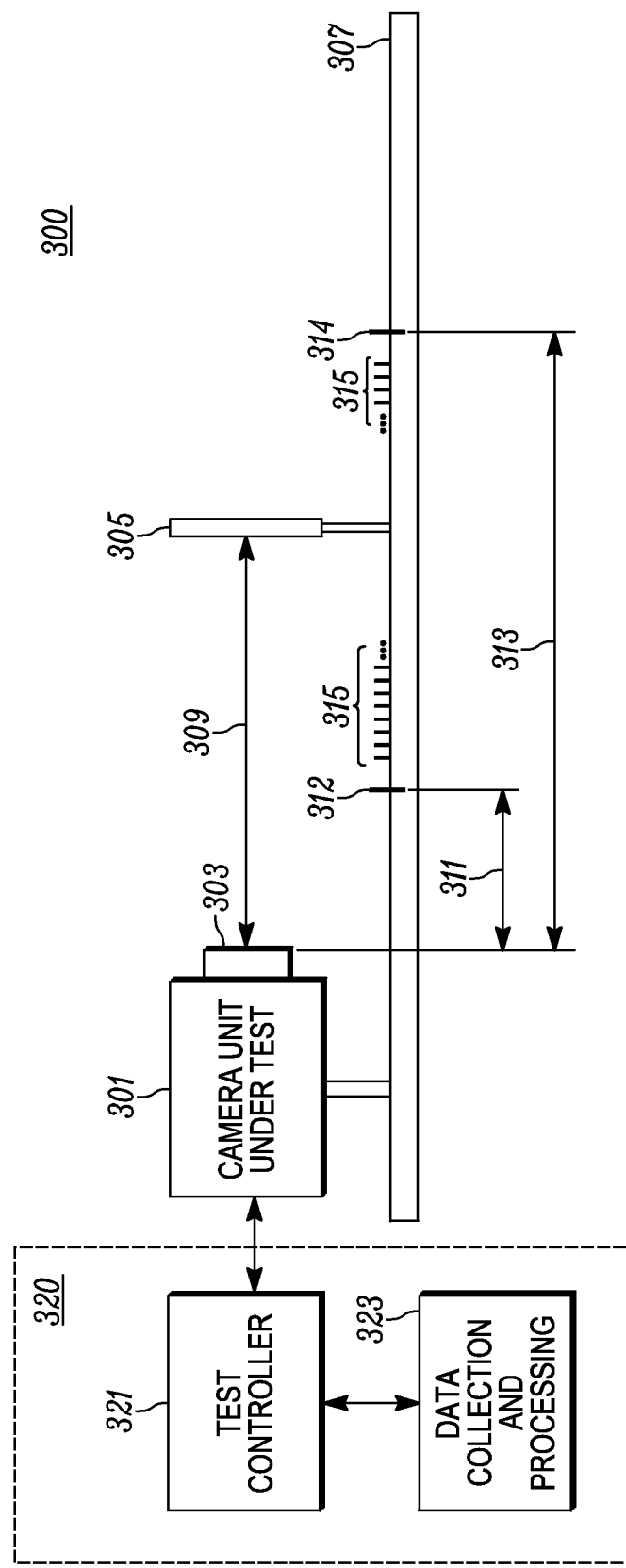
FIG. 3 is block diagram of an example test setup for generating a look-up-table for a camera unit under test in accordance with an embodiment.

In FIG. 3, a camera unit under test 301 is positioned on a fixture of a graduated linear slide 307 such that its lens 303 is at a measured distance 309 from a contrast chart 305 as determined by various stop positions 315. In the test setup 300, the camera unit under test 301 may be placed in a fixed position and the contrast chart 305 may be moved to various positions relative to lens 303. However in other embodiments of the test setup 300, the contrast chart 305 may be fixed and the camera unit under test 301 may be moved. The camera unit under test 301 is operatively coupled to a testing system 320 that includes a test controller 321 and a data collection and processing unit 323. The contrast chart 305 is adjusted by sequentially moving it to one of the stop positions 315 beginning with start position 312 up to the end position 314.

The start position 312 is set at the lens 303 macro distance 311 and the end position 314 is set at the lens 303 maximum focus distance 313. The macro distance 311 and the maximum focus distance 313 are determined using the lens 303 specifications for the camera unit under test 301. The interval of every two stop positions 315 is designed according to the sample measurement between lens position and focus distance, provided by the lens manufacturer, or according to the required precision in focus distance.

Figure 4:
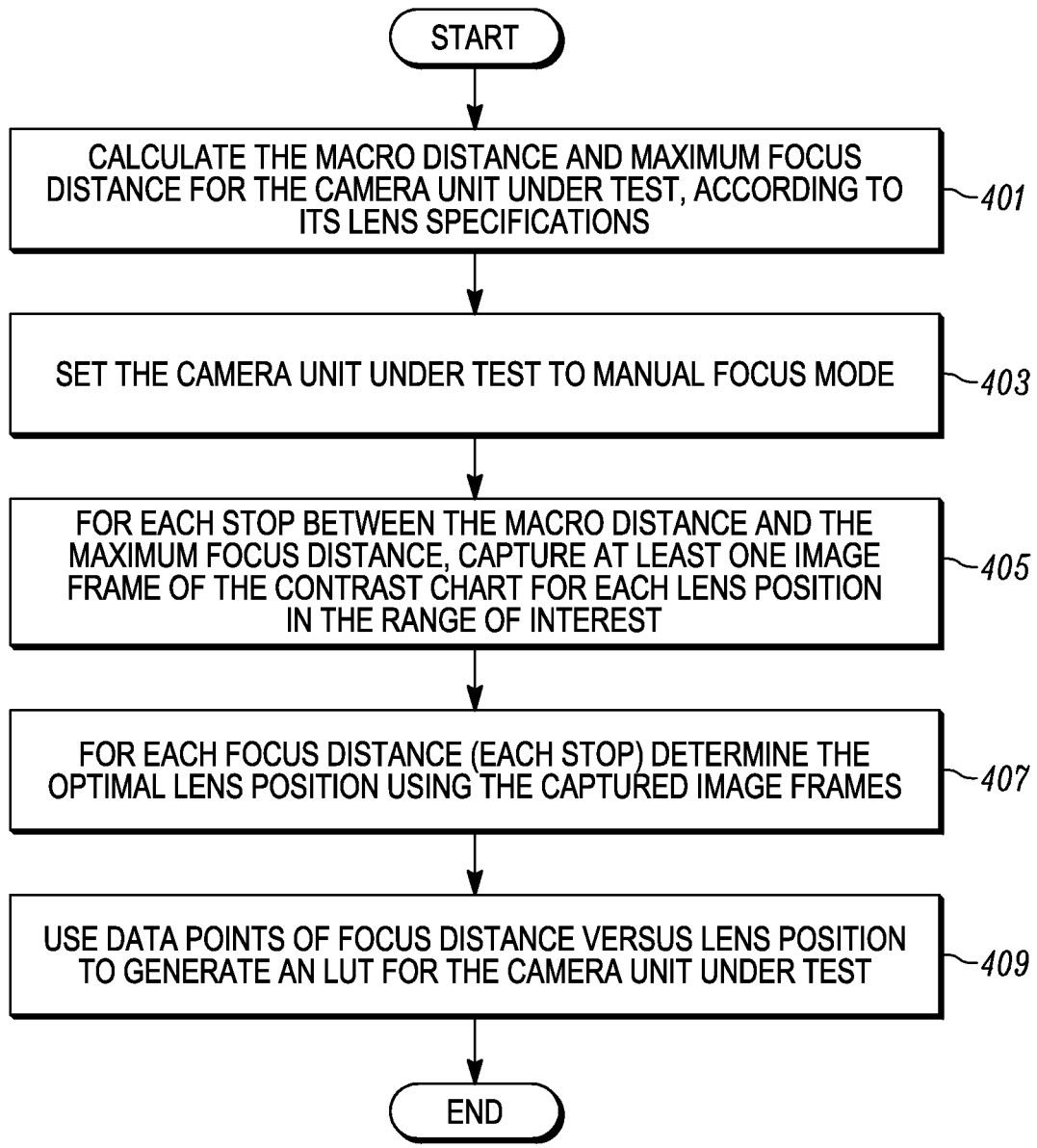
FIG. 4 is a flow chart illustrating a process for generating the look-up-table for a camera unit under test using a test setup like the example test setup shown in FIG. 3.

The test controller 321 operates the camera unit under test 301 to capture one or more image frames for each position of the contrast chart 305 at each stop position 315, and to send the image frame data to the data collection and processing unit 323. FIG. 4 is a flow chart illustrating a process for generating a lookup table of lens position settings versus focus distance for the camera unit under test 301 using the test setup 300.

In operation block 401, the macro distance 311 and maximum focus distance 313 for the camera unit under test 301 are calculated according to the lens 303 specifications. In operation block 403, the test controller 321 sets the camera unit under test 301 to manual focus mode. In operation block 405, for every stop position 315 from the start position 312 to the end position 314, at least one image frame or multiple image frames of the contrast chart 305 are captured for each lens 303 position in a range of interest. The stop positions 315 therefore correspond to various focus distances that are to be measured. For each captured image frame, a focus score is determined by the data collection and processing unit 323. The "focus score" is determined by a calculation that results in a measure related to the sharpness or contrast of the captured image frame. A global peak in the focus score is used to determine the best lens position setting at the corresponding measured focus distance.

Figure 5:
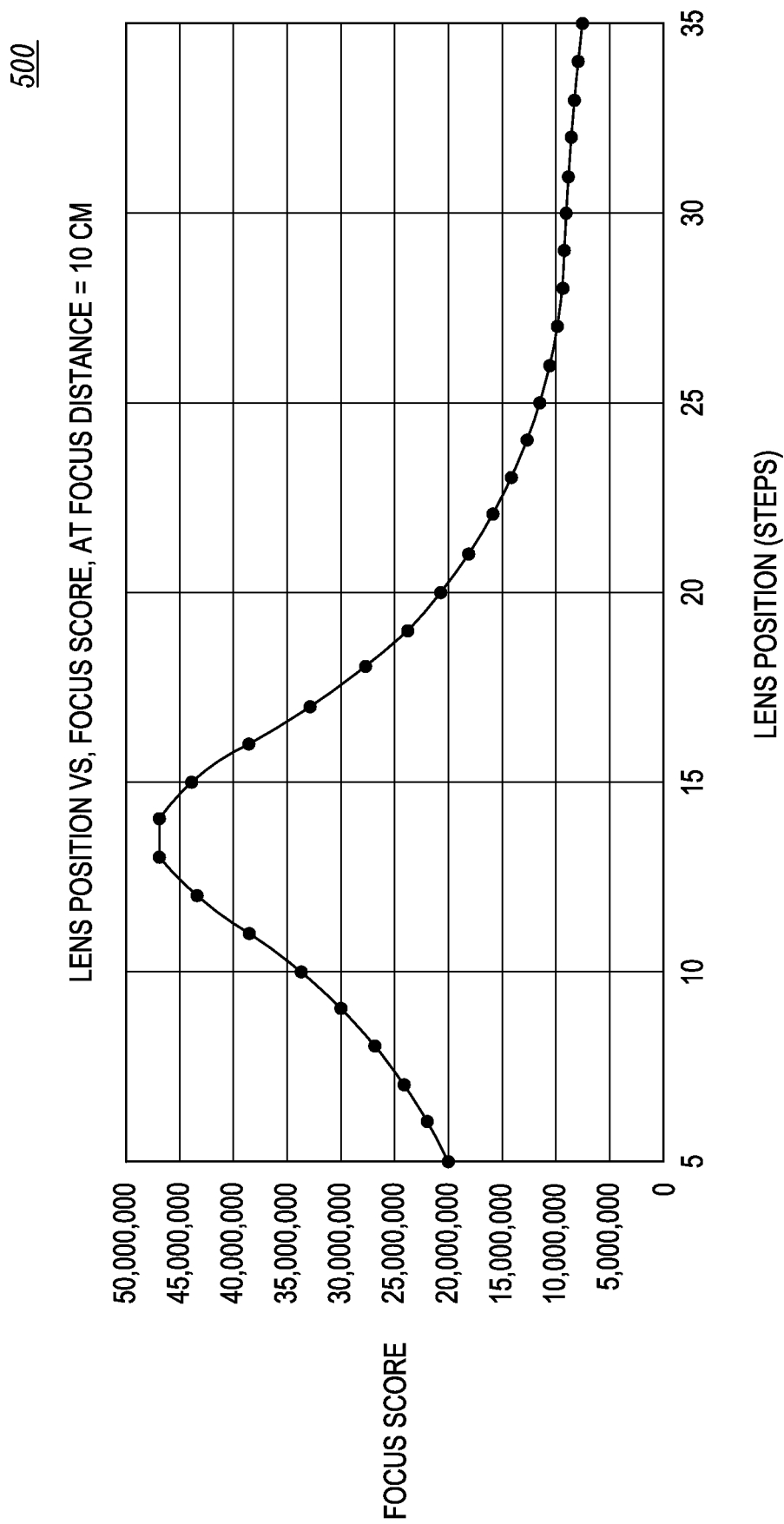
FIG. 5 is an example graph of lens position versus focus score which may be obtained using the process shown in FIG. 4 and the example test setup shown in FIG. 3.

For the first evaluation camera unit under test, a longer range of lens positions may be used to detect the global peak per focus distance. For subsequent camera units under test, a shorter range of interest in lens positions can be used to detect the global peak per focus distance, because the data points of the first evaluation camera unit help to narrow down a shorter range of interest in lens position. Turning briefly to FIG. 5, an example graph 500 of focus score at a focus distance of 10 centimeters exhibits a peak corresponding to an optimal lens position for focus. Thus returning to FIG. 4, in operation block 407, an optimal lens position can be determined by the data collection and processing 323 using data points such as shown in the example graph 500. In operation block 409, the collected data points can be used to generate the lookup table for the camera unit under test 301. This lookup table may be stored in non-volatile, non-transitory memory of the camera unit under test 301 such as memory 207 illustrated in the example camera unit 200.

As described above with respect to FIG. 2, the lens actuator 203 of a camera unit in the various embodiments may be a VCM or may be a MEMS linear actuator. For an autofocus actuator with a closed-loop mechanism, the lens position is not affected by gravity. Therefore performance of such a closed-loop actuator is not impacted by different lens postures. In this case, one lookup table is sufficient to be generated during calibration using the above described calibration procedure. However for an open-loop autofocus actuator, i.e. an autofocus actuator without a closed-loop mechanism such as a VCM, the lens position must also be calibrated according to different lens postures, because gravity will impact the amount of preload on one or more return springs of the VCM component. In other words, the lookup table of lens position versus focus distance may be different with respect to the posture of the camera unit under test due to gravity. Therefore in this case, at least three lens postures will be measured, such as by pointing the camera unit upwardly, pointing the camera unit horizontally (as described in FIG. 3) and pointing the camera unit downwardly. Also in this case, the camera unit under test may also include the one or more sensors with at least a gyroscopic sensor or equivalent that is operative to detect the posture of the camera unit during still image capture. Subsequent to factory calibration, during operation of the camera unit, the camera calibration data (which may be in lookup table format) that is germane to the posture of the camera unit is selected for autofocus operations in accordance with the embodiments.

It is to be understood that the camera calibration data may be stored in various formats including a set of lookup tables specific to one or more postures, or as a single lookup table with a set of offsets from a reference posture, or as the raw camera calibration data. In other words, the autofocus logic 140 may access the raw camera calibration data for each camera unit and may construct one or more lookup tables using the data points in some embodiments.

Figure 6:
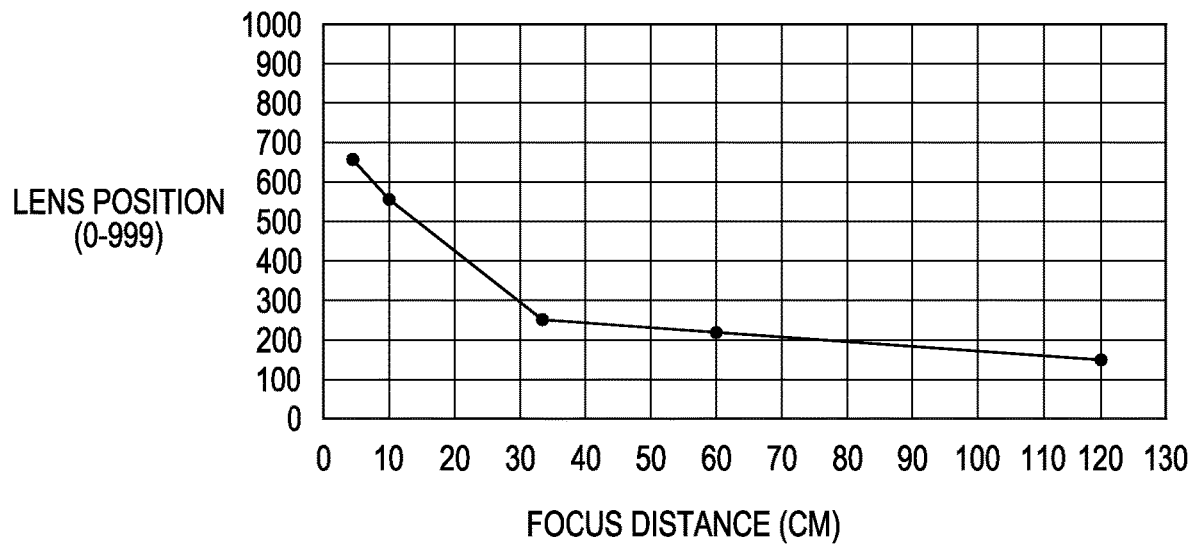
FIG. 6 is an example graph of focus distance versus lens position which may be obtained using the process shown in FIG. 4 and the example test setup shown in FIG. 3.

FIG. 5 is an example graph 500 of lens position versus focus score which may be obtained using the process shown in FIG. 4 and the example test setup shown in FIG. 3. This information may be used to determine lens position settings that should be used for a given focus distance and to generate a lookup table that may be stored directly in the camera unit memory. FIG. 6 is another example graph of measured data points for focus distance versus lens position for a camera unit autofocus actuator which may be obtained using the process shown in FIG. 4 and the example test setup shown in FIG. 3.

Figure 7:
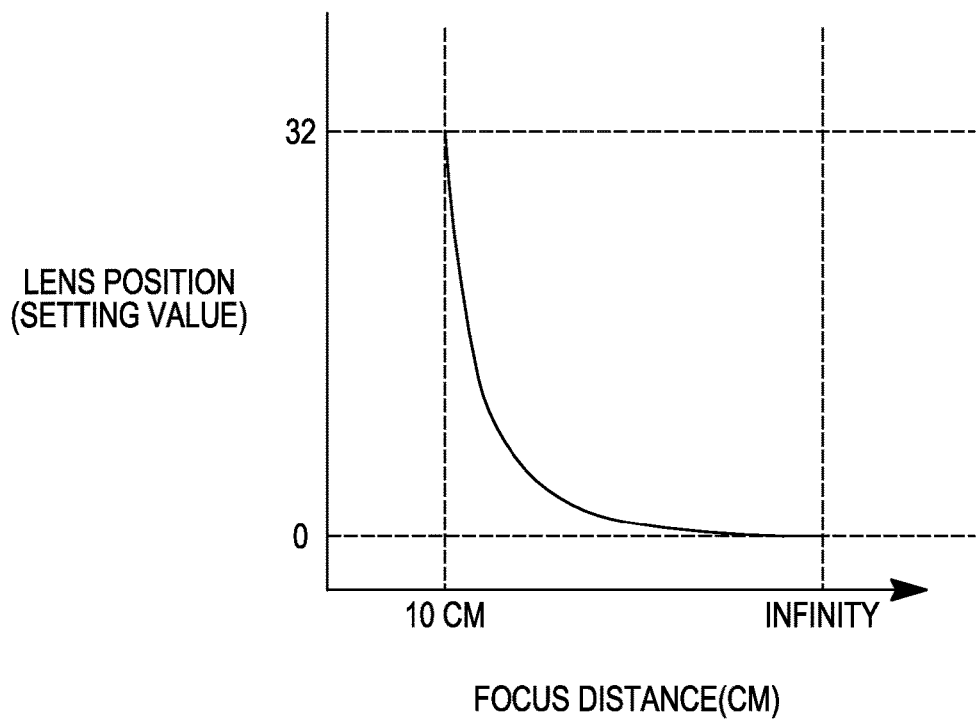
FIG. 7 is an example graph of focus distance versus lens position settings corresponding to the generated lookup table which may be obtained using the process shown in FIG. 4 and the example test setup shown in FIG. 3 in accordance with various embodiments.

FIG. 7 is an example graph of focus distance versus lens position settings corresponding to a generated lookup table which may be obtained using the process shown in FIG. 4 and the example test setup shown in FIG. 3 in accordance with various embodiments. The y-axis corresponds to the specific lens position setting values for the camera unit versus focus distance which will have variations from camera unit to camera unit. The information of FIG. 7 is therefore unique to each camera unit and is stored in non-volatile, non-transitory memory as a result of factory calibration procedures according to FIG. 3 and FIG. 4.

The terms "focus distance" and "lens position" are used throughout the description of the present disclosure. It is to be understood that the term "focus distance" may also be referred to as, or may be considered synonymous with, the terms "object distance," or "scene object distance." The "focus distance," (or "object distance" or "scene object distance" may be defined in millimeters or centimeters. It is to be understood that the terms "lens position" or "lens position steps" may also be referred to as, or may be considered synonymous with, the terms "digital-to-analog converter (DAC) counts," "lens displacement," "displacement," "lens stroke," or "stroke." DAC counts may be converted to steps using a formula, for example, five DAC counts may be equal to one step. "Lens displacement," or "lens stroke" may be converted to steps given a known interval (for example in millimeters) between two steps. Also, a voltage value may also correspond to lens positions in which the voltage value may be converted to lens position in steps by a formula or by using a lookup table.

Figure 8:
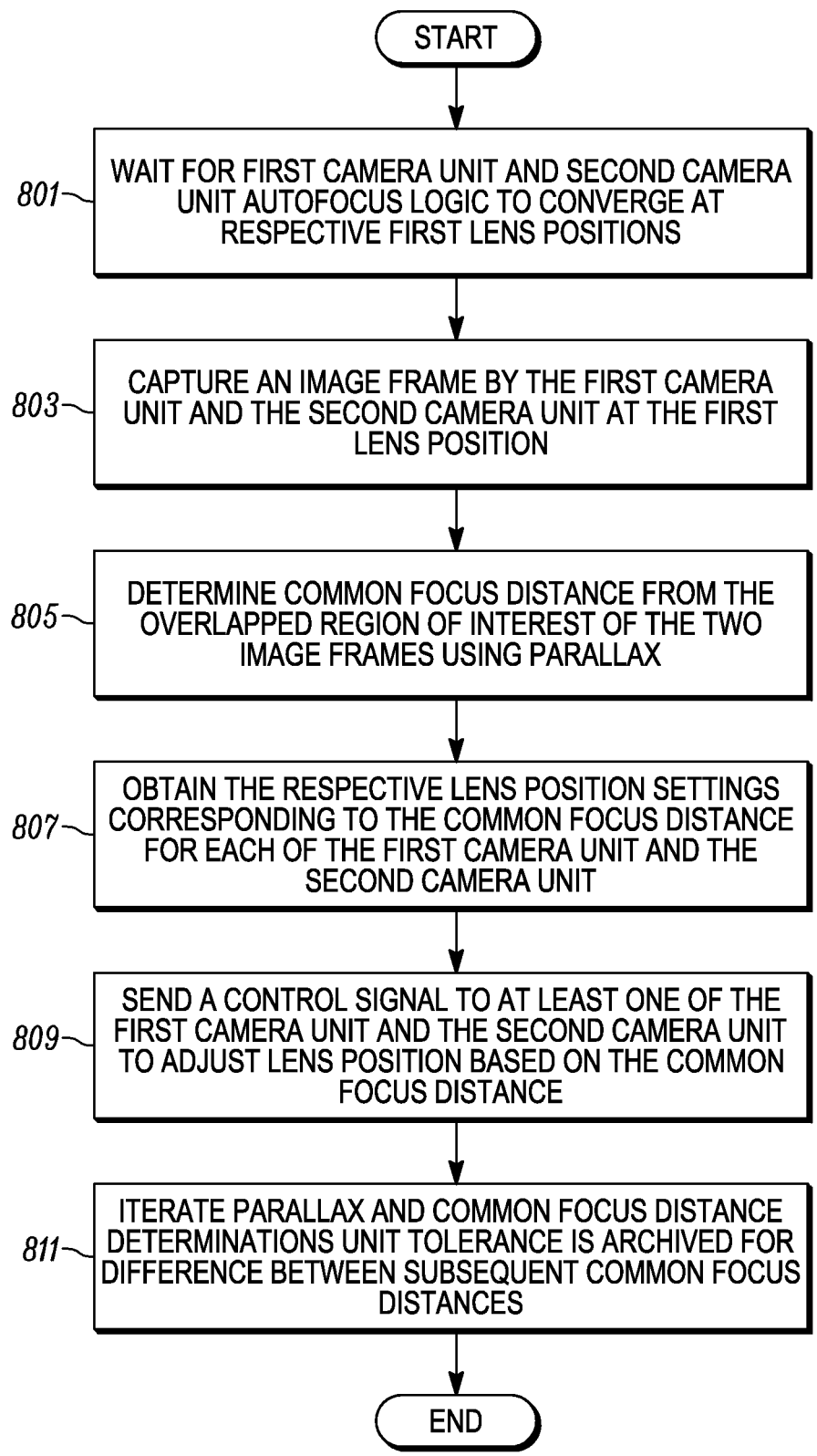
FIG. 8 is a flow chart illustrating a process for synchronizing auto-focus operations in a multi-camera apparatus in accordance with an embodiment.

FIG. 8 is a flow chart illustrating a process for synchronizing autofocus operations in a multi-camera apparatus using the camera unit calibration data like that in FIG. 7, in accordance with an embodiment. Although the process described in FIG. 8 will refer to using two camera units for the purpose of simplifying the explanation, it is to be understood that the process may be extended to any number of camera units. For example, in an apparatus having four camera units, the process may be applied to every two camera units independently. For example, the process may be applied to the following six pairs: (1) camera unit 1 and camera unit 2; (2) camera unit 1 and camera unit 3; (3) camera unit 1 and camera unit 4; (4) camera unit 2 and camera unit 3; (5) camera unit 2 and camera unit 4; (6) camera unit 3 and camera unit 4. The results from the six pairs may then be processed, etc.

Given that lookup tables of lens position settings versus focus distances are available or may be generated for a first camera unit and a second camera unit, a common focus distance is determined according to the method of operation of FIG. 8. In operation block 801, the control logic 120 waits for the autofocus routine of the first camera unit to converge at an initial lens position. Likewise in operation block 801, the second camera unit autofocus routine also converges at a first lens position. In operation block 803, a first image frame is captured in preview mode by the first camera unit at its initial lens position, and a second image frame is captured in preview mode by the second camera unit at its initial lens position. The first image frame and the second image frame are sent to the control logic 120 as output frames 112 over the operative coupling 111. These image frames are obtained by the parallax logic 130.

Figure 9:
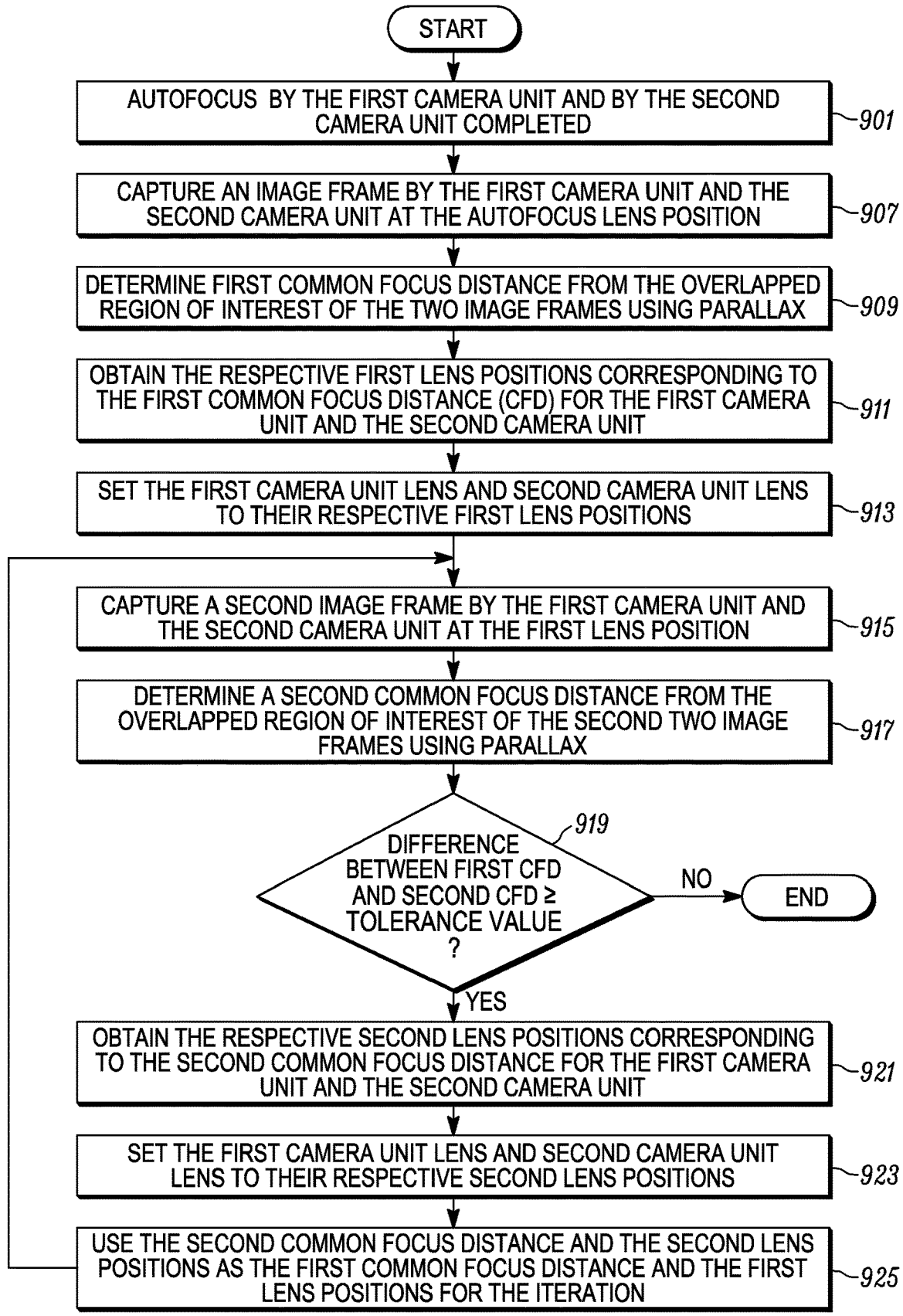
FIG. 9 is a flow chart illustrating further details of a process for synchronizing auto-focus operations in a multi-camera apparatus in accordance with an embodiment.

In operation block 805, the parallax logic 130 applies a parallax detection algorithm to an overlapped region of interest on the two image frames to determine a common focus distance 131. The common focus distance 131 is sent to the autofocus logic 140. In operation block 807, the autofocus logic 140 may obtain the respective lens position settings of the first camera unit and the second camera unit by communicating with a processor or by accessing memory of the respective camera units. In operation block 809, the autofocus logic 140 will send one or more control signals 141 to adjust the lens positions of at least one of the first and second camera units to correspond with the determined common focus distance. In operation block 811, the control logic 120 will iterate the parallax and autofocus operations until a tolerance is achieved for a difference between subsequently determined common focus distances. The lens position settings for the first and second camera units may be determined by the autofocus logic 140 by accessing memory and reading the respective first and second lookup tables corresponding to the camera units. FIG. 9 is a flow chart illustrating further details of a process for synchronizing autofocus operations in a multi-camera apparatus in accordance with an embodiment.

The method of operation begins and in operation block 901 the control logic 120 waits for the autofocus routines of the first camera unit and the second camera units to each converge at an initial lens position such that the autofocus routine of each of the camera units is completed. In operation block 907, a first image frame is captured in preview mode by the first camera unit as its initial lens position, and a second image frame is captured in preview mode by the second camera unit as its initial lens position. The first image frame and the second image frame are sent to the control logic 120 as output frames 112 over the operative coupling 111. These image frames are obtained for processing by the parallax logic 130.

Figure 10:
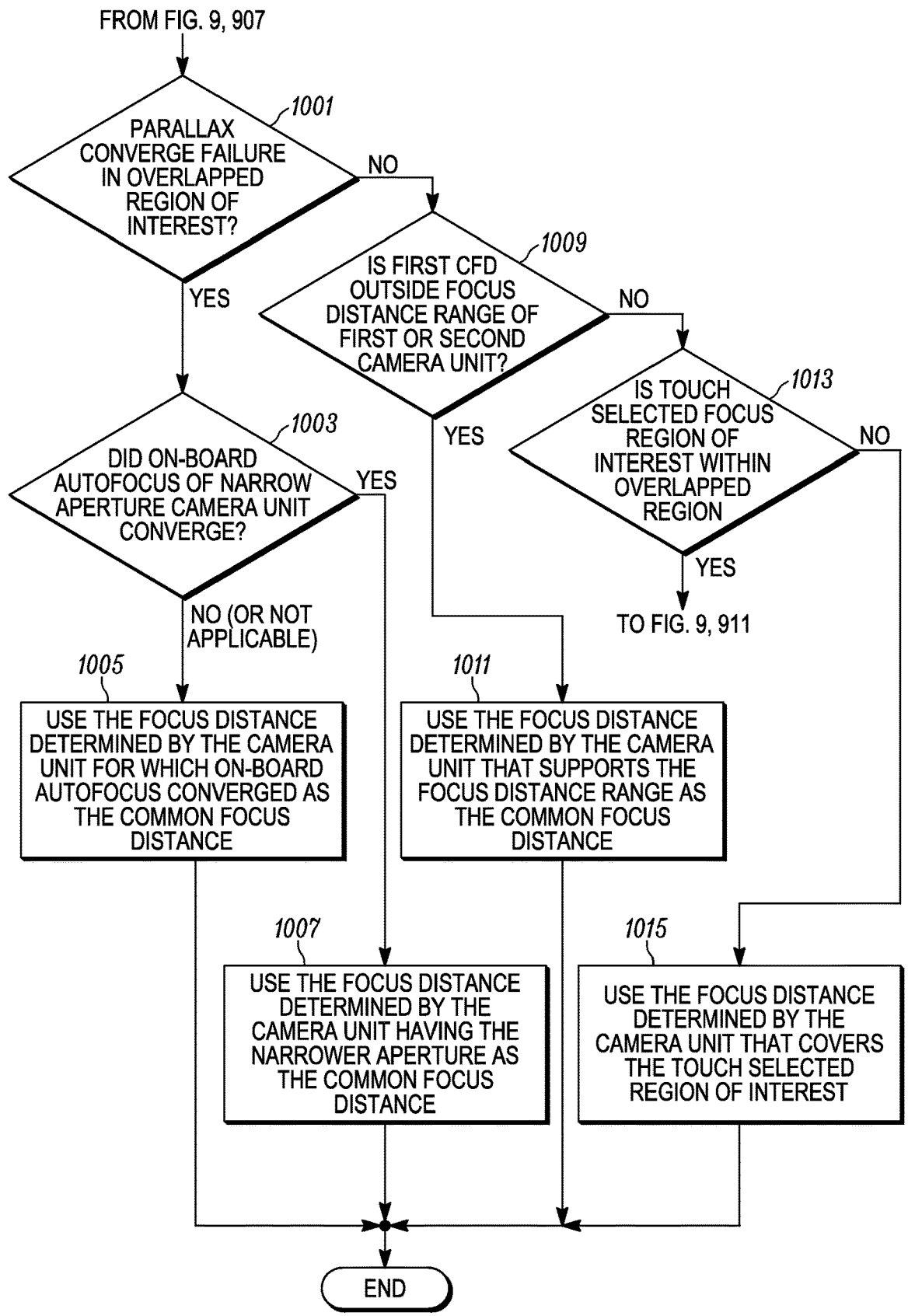
FIG. 10 is a flow chart illustrating exception handling for cases where a parallax operation in FIG. 9 fails, in accordance with an embodiment.

In operation block 909, the parallax logic 130 applies a parallax detection algorithm to an overlapped region of interest on the two image frames to determine a common focus distance 131. If the parallax operation fails, an exception procedure is implemented as shown in FIG. 10. If the parallax operation succeeds, the common focus distance 131 is sent to the autofocus logic 140. In operation block 911, the autofocus logic 140 may obtain the respective first lens position settings of the first camera unit and the second camera unit by accessing memory and reading the respective lookup tables of the first and second camera units at a point corresponding to the determined common focus distance. In some embodiments, the memory may be an on-board memory component of each respective camera unit as shown in FIG. 2, or may be a separate memory component of the apparatus 100 in other embodiments.

In operation block 913, the autofocus logic 140 will send one or more control signals 141 to adjust the lens position of at least one of the first and second camera units to the respective first lens position settings obtained from the corresponding lookup tables. The method of operation then proceeds to iterate beginning in operation block 915 until a tolerance is achieved for a difference between subsequently determined common focus distances.

In operation block 915, a second image frame is captured in preview mode by each of the first camera unit and by the second camera unit. In operation block 917, the parallax logic 130 again applies the parallax detection algorithm to the overlapped region of interest on the two image frames to determine a second common focus distance 131.

In decision block 919, if the difference between the first common focus distance (CFD) and the second CFD are greater than, or equal to, a tolerance value, then the autofocus logic 140 will proceed with operation block 921, access the respective lookup tables, and send one or more control signals 141 to adjust the lens positions as shown in operation block 923. In operation block 925, the second common focus distance and second lens positions are then considered the starting point for a further iteration and the method of operation proceeds by returning to operation block 915. These iterations continue until the difference between the CFDs is less than the tolerance value in decision block 919, at which point the method of operation terminates and the common focus distance has thus converged.

The flowchart of FIG. 10 illustrates exception handling for cases in which the parallax detection algorithm executed in operation block 909 for FIG. 9 fails to converge and for other conditions that will now be described. If in decision block 1001 the parallax detection algorithm cannot converge in the overlapped region of interest, and the detected focus distances between two camera units' respective autofocus routines disagree, then the common focus distance can be determined by the camera unit that has a narrower aperture. In other words, a camera unit with a narrower aperture, which will have a higher F-number, will exhibit a wider peak in the graph of focus score versus lens position (such as in the example graph 500 shown in FIG. 5). Therefore, if one of the camera units has a narrower aperture, and if its autofocus routine converges for the scene in decision block 1003, then the process may proceed to operation block 1007 use the focus distance determined by that camera unit's autofocus routine as the common focus distance. No iteration is required and the method of operation exits the process shown in FIG. 9 and terminates.

However, if the narrower aperture camera unit's autofocus did not converge in decision block 1003, or if neither camera unit has a narrower aperture with respect to the other, the process proceeds to operation block 1005 and uses the focus distance determined by the camera unit for which the autofocus routine converged as the common focus distance. Again in this case, no iteration is required and the method of operation exits the process shown in FIG. 9 and terminates. In some embodiments, the approach of using a narrower aperture camera unit to determine the common focus distance may be used to avoid the computation time required for performing iterations.

If in decision block 1001 the parallax detection algorithm successfully converges in the overlapped region of interest, a check is made in decision block 1009 of whether the determined common focus distance is outside the focus distance range of one of the camera units. If the common focus distance is outside the range, then the process proceed to operation block 1011 and uses the focus distance determined for the camera unit that supports the focus distance range as the common focus distance. In other words, if one camera unit cannot focus in the range, then the parallax operation is not reliable because the image from that camera unit may be blurry. Therefore, in this case, the method of operation exits the process shown in FIG. 9 and terminates.

If in decision block 1001 the parallax detection algorithm successfully converges in the overlapped region of interest, and neither camera unit is outside its focus distance range in decision block 1009, the process proceed to decision block 1013. In decision block 1013, a check is made of whether a touch-to-focus feature was used to select a focus region of interest and whether that selected focus region of interest is within the overlapped region of the two image frames captured by the two camera units. If the touch selected focus region is within the overlapped region, then the process proceeds to operation block 911 in FIG. 9 and operations continue as described above with respect to FIG. 9. However if the touch selected focus region is outside the overlapped region, then the process proceeds to operation block 1015 and uses the focus distance determined for the camera unit that covers the touch selected region of interest. The method of operation exits the process shown in FIG. 9 and terminates.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. An apparatus, comprising:
   a plurality of camera units, each camera unit comprising a lens, a sensor, and an actuator to adjust the lens position; and
   control logic, operatively coupled to each camera unit, operative to:
   perform a parallax operation using at least two image frames from at least two camera units to determine a common focus distance, subsequent to completing independent auto-focus operations and respective lens position adjustments for the at least two camera units, where each of the at least two images frames are captured by the respective first camera unit and second camera unit using the independent auto-focus operations and respective lens position adjustments; and provide a control signal to at least one of the camera units to adjust the at least one camera unit actuator, in response to the common focus distance determination, to set the at least one camera unit lens to a lens position corresponding to the common focus distance, wherein one of the at least two camera units has a narrower aperture than the other of the at least two camera units, wherein the control logic is operative to:
   determine the parallax operation failed in an overlapped region of interest and
   use a focus distance determined by the camera unit having the narrower aperture as the common focus distance when the parallax operation failed in an overlapped region of interest.

2. The apparatus of claim 1, further comprising:
non-volatile, non-transitory memory, operatively coupled to the control logic; and camera calibration data for each camera unit, stored in the non-volatile, non-transitory memory and related to lens position versus focus distance settings for each camera unit.

3. The apparatus of claim 2, wherein the control logic is further operative to:
access the memory to obtain the camera calibration data for each camera unit.

4. The apparatus of claim 1, wherein the control logic is further operative to:
obtain an initial lens position setting for each camera unit from the corresponding actuator of each camera unit.

5. The apparatus of claim 4, wherein the control logic is further operative to:
iterate the parallax operation by obtaining another at least two image frames subsequent to setting the at least one camera unit lens to a lens position corresponding to the common focus distance and determine an iterated common focus distance; and
provide at least a second control signal to at least one or another of the at least two camera units to set the respective lens position to a final lens position corresponding to the iterated common focus distance.

6. The apparatus of claim 4, wherein the control logic is further operative to:
provide the control signals as a lens position setting unique to each camera unit based on camera calibration data for each camera unit, stored in a non-volatile, non-transitory memory and related to lens position versus focus distance settings for each camera unit.

7. The apparatus of claim 6,
wherein the non-volatile, non-transitory memory is distributed as a separate memory located in each camera unit, operatively coupled to the control logic; and
wherein the camera calibration data specific to each camera unit, is stored in the memory of each camera unit, respectively.

8. The apparatus according to claim 1, wherein the at least one of the camera units captures an image with the at least one camera unit lens set to the lens position corresponding to the common focus distance.

9. A method comprising:
performing a parallax operation using at least two image frames from at least two camera units to determine a common focus distance, subsequent to completing independent auto-focus operations and respective lens position adjustments for the at least two camera units, where each of the at least two images frames are captured by the respective first camera unit and second camera unit using the independent auto-focus operations and respective lens position adjustments; and
adjusting an actuator of at least one camera unit, in response to the common focus distance determination, to set the at least one camera unit lens to a lens position corresponding to the common focus distance, wherein one of the at least two camera units has a narrower aperture than the other of the at least two camera units, and wherein the method comprises:
   determining the parallax operation failed in an overlapped region of interest; and
   using a focus distance determined by the camera unit having the narrower aperture as the common focus distance when the parallax operation failed in an overlapped region of interest.

10. The method of claim 9, further comprising:
obtaining camera calibration data for each camera unit, stored in a non-volatile, non-transitory memory and related to lens position versus focus distance settings for each camera unit.

11. The method of claim 10, further comprising:
accessing the memory to obtain the camera calibration data for each camera unit; and
adjusting the actuator of the at least one camera unit using the related camera calibration data.

12. The method of claim 9, further comprising:
obtaining an initial lens position setting for each camera unit from corresponding actuator of each camera unit.

13. The method of claim 12, further comprising:
iterating the parallax operation by obtaining another at least two image frames subsequent to setting the at least one camera unit lens to a lens position corresponding to the common focus distance and determine an iterated common focus distance; and
adjusting an actuator of at least one or another of the at least two camera units to set the respective lens position to a final lens position corresponding to the iterated common focus distance.

14. The method of claim 12, further comprising:
adjusting the actuator using a lens position setting unique to each camera unit based on camera calibration data for each camera unit, stored in a non-volatile, non-transitory memory and related to lens position versus focus distance settings for each camera unit.

15. The method of claim 14, further comprising:
accessing memory that is distributed as a separate memory located in each camera unit to obtain the lens position setting.

16. The method according to claim 9, further comprising capturing an image using the at least one camera unit with the at least one camera unit lens set to the lens position corresponding to the common focus distance.

* * * * *